(No Model.)
E. C. KEYS.
LIFTER AND TRUCK.
No. 301,820. Patented July 8, 1884.
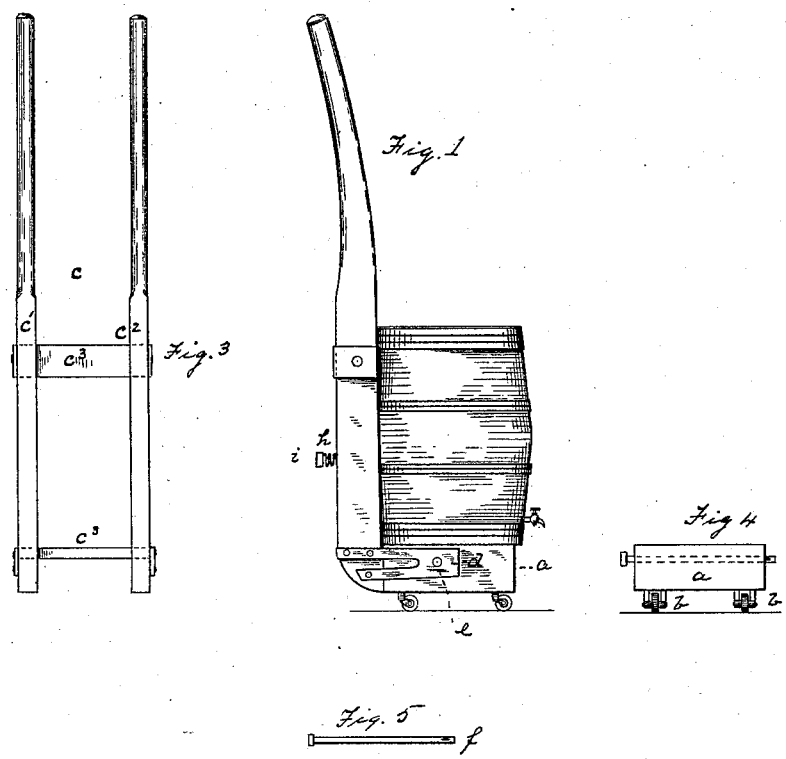
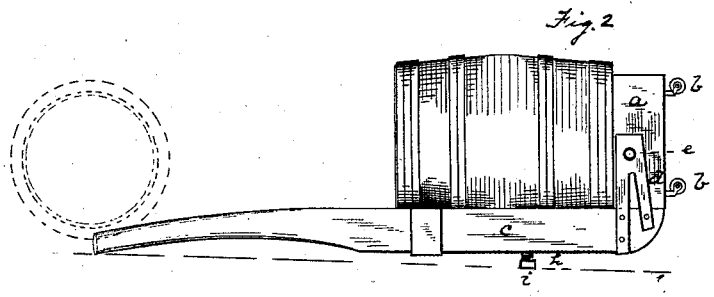
Witnesses
Jno. K. Smith
Thomas W. Bakewell
Inventor
Ezra C. Keys
by his attorneys
Bakewell & Kerr

UNITED STATES PATENT OFFICE.

EZRA C. KEYS, OF ALLEGHENY CITY, PENNSYLVANIA, ASSIGNOR TO HIMSELF AND JOSEPH M. AIKEN, OF SAME PLACE.

LIFTER AND TRUCK.

SPECIFICATION forming part of Letters Patent No. 301,820, dated July 8, 1884.

Application filed October 13, 1883. (No model.)

*To all whom it may concern:*

Be it known that I, EZRA C. KEYS, of Allegheny City, in the county of Allegheny and State of Pennsylvania, have invented a new and useful Improvement in Lifter and Truck; and I do hereby declare the following to be a full, clear, and exact description thereof.

My invention relates to an improved truck and lifter; and it has for its object a truck and detachable lifter for lifting and supporting barrels, hogsheads, boxes, and other heavy articles; and it consists in the combination, with a tilting platform-truck, of detachable skid-handles, whereby the handles may be first used as skids and then as lifters for raising the burden and depositing it on the truck, all as will hereinafter more fully appear.

I will now describe my invention, so that others skilled in the art may manufacture and use the same, reference being had to the accompanying drawings, in which—

Figure 1 is a side elevation of the truck resting on its casters and having the lifter attached. Fig. 2 is a side elevation of the truck when in a vertical position, the lifter attached thereto being placed horizontally. Fig. 3 is a detached view of the lifter. Fig. 4 is a detached view of the truck, and Fig. 5 is a detached view of the securing-pin.

Like letters of reference indicate like parts wherever they occur.

In the drawings, $a$ represents a truck or platform having wheels or casters $b$; and $c$, a lifter or skid, consisting of two parallel arms, $c'$ $c^2$, united by the transverse bars $c^3$, the said lifters or handles, when placed horizontally, forming an inclined plane or skids to facilitate the loading of the truck, to which they are temporarily attached, and subsequently serving as lifters for elevating the load and depositing it on the truck. At one end of the arms $c'$ $c^2$ are the lugs or brackets $d$, which may be formed of any suitable material, and are provided with a hole or eye, $e$, through which passes a pin, $f$, which pin also passes through slots or holes in the side of the truck, so as to secure the lifter to the truck in a vertical position when the truck is resting on the wheels or casters $b$.

The operation is as follows: The truck $a$ and lifter $c$ being united or joined together by means of the pin $f$ passing through the holes in the truck and brackets, the lifter is placed in a horizontal position, the truck being thereby brought into a vertical position, as shown in Fig. 2. The barrel or hogshead is rolled onto the arms $c'$ $c^2$ of the lifter, and then turned so as to lie between and parallel with the arms $c'$ $c^2$. The lifter is then raised into a vertical position, the ends of the arms $c'$ $c^2$ acting as a fulcrum, which brings the truck on its wheels or casters in a horizontal position. The lifter is then detached from the truck by removing the pin $f$, leaving the barrel, box, or other article standing on the truck, which may then be wheeled to any desired position. In the case of hogsheads and barrels, where it is desired to attach a faucet to the barrel, this is done after the barrel or hogshead has been placed on the lifter and before it is raised to a vertical position.

In order to assist in lifting the barrel or other article, as already described, springs $h$ may be secured to the arms $c'$ $c^2$ of the lifter, near the lower end thereof, the other ends of which springs are united or connected by the transverse horizontal bar $i$. Where the springs $h$ are omitted, the usual rigid legs may be employed, similarly placed, to cause the proper inclination of the lifters when serving as skids. When the lifter is lowered so as to receive the article to be placed on the truck, it forms an inclined plane, owing to the end thereof being supported by the springs. When, however, the barrel or other article is moved or placed on the lifter over the springs, the springs are contracted or depressed by the weight, and by their reactive force aid materially in raising the lifter when it is brought into its vertical position.

The advantages of my invention are, that by means of my improved lifter and truck heavy weights are easily lifted and placed upon the truck or platform by one person, where heretofore the labor of several persons has been required. It is also simple, durable, and may be applied for lifting and supporting all kinds of heavy articles.

Having thus described my invention, what I claim, and desire to secure by Letters Patent, is—

1. The combination, with a tilting platform-truck, of detachable lifters arranged and adapted to form skids to facilitate the loading of the truck, and lifters for raising the load, substantially as and for the purposes specified.

2. The combination of a tilting platform-truck and detachable lifters adapted to serve as skids, and arranged at an angle to the platform of the truck, substantially as and for the purposes specified.

3. The combination, with a tilting platform-truck, of detachable lifters adapted to serve as skids, said lifters being provided with springs to assist in raising the load, substantially as and for the purposes specified.

4. The combination of the tilting platform-truck and the vertically-arranged lifters, provided with the brackets and pin, for detachably connecting the same to the platform-truck, substantially as and for the purposes specified.

In testimony whereof I have hereunto set my hand this 10th day of October, A. D. 1883.

EZRA C. KEYS.

Witnesses:
JAMES K. BAKEWELL,
M. H. HOUSEMAN.